2 Sheets--Sheet 1.
J. R. McPHERSON.
Stock-Car.
No. 165,850.
Patented July 20, 1875.
FIG I
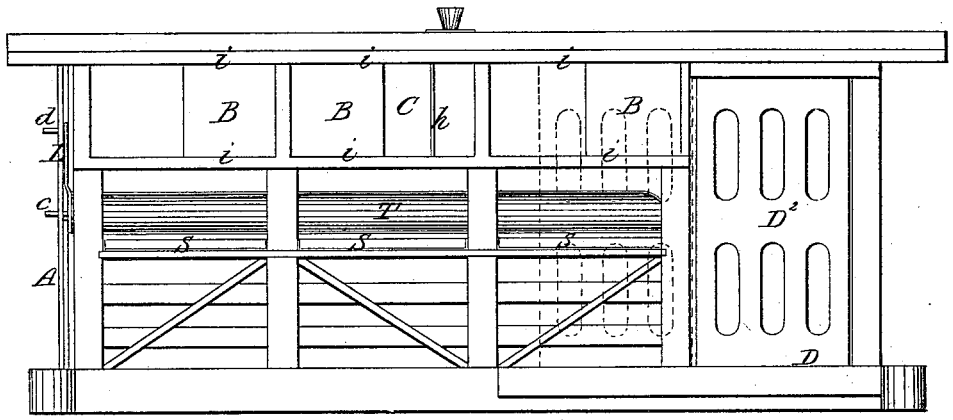
FIG II
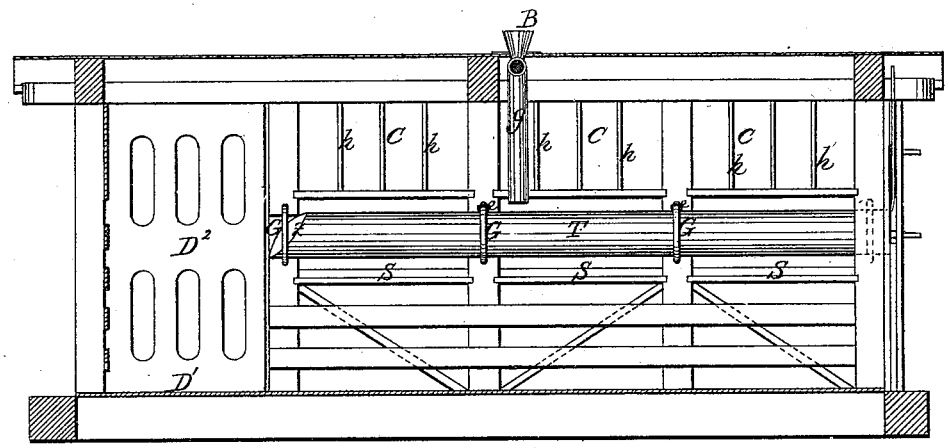
WITNESSES
John E. Laing.
J. H. Rutherford
INVENTOR
John R. McPherson
By Johnson & Johnson
his Attys.

2 Sheets--Sheet 2.
J. R. McPHERSON.
Stock-Car.
No. 165,850. Patented July 20, 1875.
FIG III  FIG IV
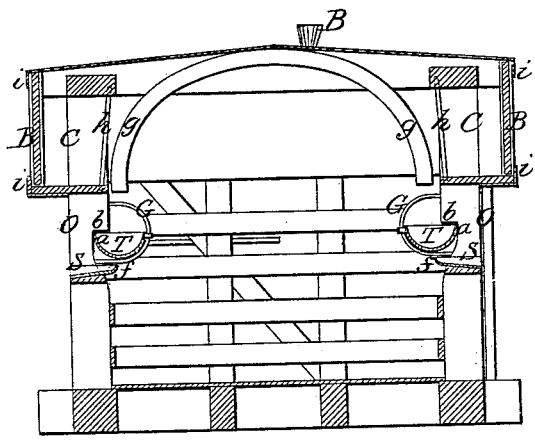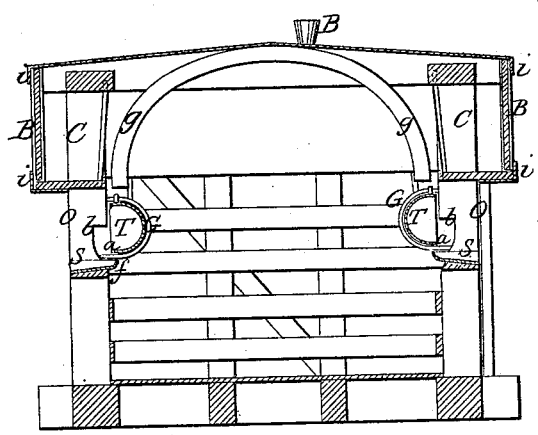
FIG V
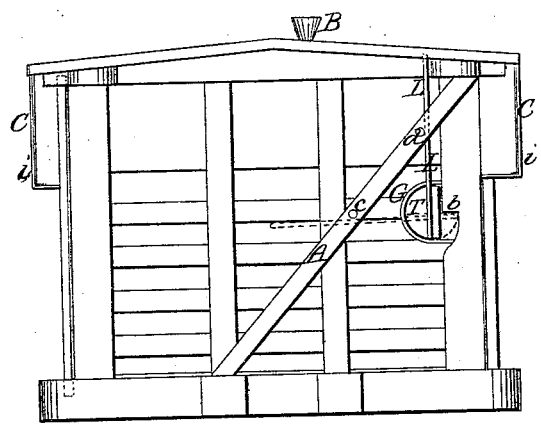
FIG VI
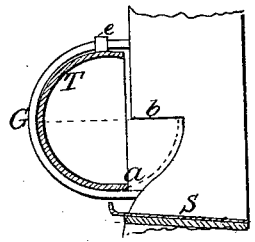
WITNESSES
John E. Laing
J. A. Rutherford
INVENTOR
John R. McPherson
By Johnson and Johnson
his Attys.

UNITED STATES PATENT OFFICE.

JOHN R. McPHERSON, OF JERSEY CITY, NEW JERSEY.

IMPROVEMENT IN STOCK-CARS.

Specification forming part of Letters Patent No. 165,850, dated July 20, 1875; application filed April 10, 1875.

*To all whom it may concern:*

Be it known that I, JOHN R. McPHERSON, of Jersey City, in the county of Hudson and State of New Jersey, have invented certain new and useful Improvements in Stock-Cars; and I do hereby declare that the following is a full, clear, and exact description thereof, which will enable others skilled in the art to which it pertains to make and use the same, reference being had to the accompanying drawings, and to the letters of reference marked thereon, which form a part of this specification:

The features of invention herein claimed relate to the means for watering live stock in the transportation of the same, and are designed as an improvement upon a patent granted to me April 6, 1875, No. 161,807, in which a crib or feed-box is combined with the car-wall, and a watering-trough with wall-openings, and operated so as to discharge the contents, after feeding, outside of the car through said openings. Troughs have been employed in such cars so as to be turned either up or down upon a fixed line of hinges to empty their contents after the stock has been watered and fed. The hinges of the troughs are constantly under strain, and liable to be broken by the heavy pressure of animals' rumps against them, without regard to their position. Having a fixed line of attachment to the wall of the car the trough can only turn up and down from said point as a radius, and must, therefore, project its full width into the car when turned down, in order that it can when turned up stand in a vertical position against the car-wall.

My improvement overcomes these difficulties and objections by the combination, with the wall of a stock-car, and the recessed studs thereof, of a trough rotatable within a circle to bring it partially within the space occupied by the wall-studs when in position for watering stock, and nearly wholly within the inner-wall line when in position to discharge its contents onto the sheds, whereby a trough without a side line of hinges is combined with the car-wall in a manner to occupy the least room within the car, while preserving the wall-posts intact. The trough is confined and sustained for such movement upon its axis-line by means of circular or semicircular way-guards secured to the car-wall at suitable distances apart to form bearings for the outer surface of the trough, and within and upon which it can be rotated freely to bring the trough down in a horizontal position, or revolved to bring the inner edge of the trough down to empty the contents. When turned to feed and water the trough is held in such position within its way-supports by means of a stop-lever attached to the trough at the end of the car, and shoulders formed by recesses in the wall-timbers of the car, and within which the troughs extend, so that it does not project its full width within the car when watering the stock. A water-shed is combined with this revolving trough in such manner that when discharging the contents the inner edge of the trough moves down in the arc of a circle to meet and overlap the inner vertical flange of the water-shed and discharge the water outward through openings in wall of the car, and thereby prevent the water and dirt from being dumped in the car. Suitable loops or collars upon the trough embrace and move over the fixed guideways to brace the trough against endwise movement, and relieve the operating lever from all binding force in its guide-bar.

In the accompanying drawings, Figure 1 represents an elevation of the side of a car embracing my invention; Fig. 2, a vertical longitudinal section thereof; Fig. 3, a transverse section, with the troughs revolved to a horizontal position; Fig. 4, a similar view, with the troughs revolved to a vertical position; Fig. 5, an end elevation; and Fig. 6, a section on an enlarged scale of the trough rotated to empty the water over the shed.

The general construction of the stock-car may be substantially such as that described in my patent aforesaid, and in which the doorways D D¹ are provided in the sides of the car at its respective ends, so as to accommodate the feeding and watering devices. Sliding doors D² are opened and closed against the outer walls of the car.

Troughs T are arranged upon the inner opposite side walls of the car, and extend at suitable height from the doorways to the ends of the car. They are made of boiler-iron, and the ends next the doors are beveled off at z, so as not to project, and thereby prevented from striking the animals in entering the car.

The troughs are not secured by hinges, as in stock-cars heretofore constructed; nor do they operate to be lowered to horizontal positions, or to be elevated upon a fixed-edge line of attachment to the car-wall; but they are mounted so as to be revolved against the car-wall (within a circle of which the center of the trough is the axis) in such manner that the discharging side of the trough will rise in rotating it to a horizontal position, and descend in rotating it to a vertical position, to bring its inner edge to form a junction with the outward water-sheds S, arranged at the base of the openings O in the sides of the car.

This is the distinguishing feature of my invention; and it is accomplished by means of circular or semicircular ways or guides G, secured to the inner sides of the car at suitable intervals along the troughs. These ways or guides support the troughs, and allow them to turn within a circle a little greater than their own radius to give perfect freedom for such movement. In this way I operate the trough in a different manner from that produced by hinging one side of the trough, and dispense with stay-chains along the length of the trough.

Openings O are formed in each side of the car opposite the rotating troughs, and at the base of these openings sheet-metal water-sheds S are secured inclined downward, and provided with upturned flanges f, with which the discharging-edges a of the troughs form a junction, and overlap the flanges f to empty the contents of the troughs when rotated upward, and thus prevent the water and dirt from passing upon the floor of the car, which is very objectionable, especially in cold weather.

The inner-side timbers of the car are recessed so as to form shoulders b, beneath which the outer edge a of the trough abuts when revolved in a horizontal position, and thus, in connection with a stop-lever, L, on the end of the trough, maintain it in a horizontal position, so that it cannot be lifted by the horns or noses of the animals getting beneath it while feeding. This construction, also, lessens the projection of the troughs into the car when they are rotated to horizontal positions, and yet allows them to be revolved within the circle prescribed by the ways or guides G, and in this particular is a very important advantage in connection with the holding-shoulders for the trough.

Any suitable devices may be devised for rotating the troughs; but I have shown for this purpose a hand-lever, L, firmly secured to the end of the trough, which projects outside of the end of the car, and works within the slot of a guide-bar, A, standing obliquely at the end of the car, and provided with stop-pins, one, c, of which passes through the guide-bar A above the lever L when turned down to hold the trough locked with the shoulders b when the stock are watering, as shown by dotted lines in Fig. 5; and, by raising the lever L within the guide-bar to a vertical position to rotate the trough upward, the other pin d is passed through the guide-bar back of said lever, to hold it up and maintain the trough in its emptying position in front of the side openings, as shown in Fig. 5. These movements of the lever rotate the trough, by a positive force both ways, against the pressure made by the rumps of the animals, and are simple and most effective for the purpose.

In thus operating the trough it must turn within its circular bounds, which are strong, and not effected by any single line of strain upon the trough, the devices being of most durable construction, which is of great importance in a car for the transportation of unmanageable cattle.

The troughs are secured from endwise movement by means of strong loops e secured to their convex sides, and embracing and moving over the guideways G; or the troughs may be provided with collars, within which the guideways are fitted for the purpose stated; or stops may be arranged on opposite sides of the ways, so that the trough cannot possibly be displaced endwise, or exert any binding force upon the operating lever. A central funnel, B, with branch pipes g leading therefrom, is provided for filling the troughs from the top of the car. The openings O in front of the troughs extend longitudinally in the sides of the car to the doorways, and afford air and ventilation to the stock, and accommodate their horns; and, when the troughs are revolved in their embracing bearings to empty them, they partially close these openings to exclude wind and weather.

I have shown in the drawings cribs or feed-boxes C, with sliding doors B, whereby the animals may be fed with hay or fodder, and the cribs conveniently supplied from the outside of the car; but, as this feature of my invention forms the subject of another patent, it need not be more fully described herein.

The following is claimed as new in this improvement in stock-cars, namely:

1. The combination, with the wall of a stock-car and the recessed studs thereof, of a trough rotatable within a circle to bring it partially within the space occupied by the wall-studs when in position for watering stock, and nearly wholly within the inner-wall line when in position to discharge its contents onto the sheds, whereby a trough without a side line of hinges is combined with the car-wall in a manner to leave the wall-posts in contact while occupying the least room within the car, substantially as herein set forth.

2. The combination of the water-trough to revolve about its own axis-line of fixed embracing guides G and the side walls of the car, substantially as set forth.

3. The combination of the axially-rotating water-trough with embracing guides and stay-loops e, substantially as set forth.

4. The combination, with a fixed water-shed, S, of a trough, T, rotatable about its own axis within a circle to bring it partially within the space occupied by the wall-studs when turned down to water the stock, and with its inner edge a carried by said rotation down to the water-shed flange f, whereby a projecting trough-flange is dispensed with, and the trough rendered much lighter.

5. The combination of water-trough made to revolve about its own axis, fixed guideways, the inner wall of the car, lever L, guide-bar A, and stops c d, whereby to turn and lock the trough in either its horizontal or vertical positions, substantially as set forth.

6. The combination of a water-trough made to revolve about its own axis, fixed guideways, directing-lever, stop-shoulders b in the wall of the car, against which the inner edge of the trough abuts, and a stop-pin, c, whereby to lock lever and trough into its horizontal position, substantially as set forth.

In testimony that I claim the foregoing as my own I have affixed my signature in presence of two witnesses.

JOHN R. McPHERSON.

Witnesses:
  S. B. GOODALE,
  GILBERT SMITH.